United States Patent
Chen et al.

(10) Patent No.: US 12,347,002 B2
(45) Date of Patent: Jul. 1, 2025

(54) ELECTRONIC DEVICE AND NON-TRANSITORY COMPUTER-READABLE STORAGE MEDIUM

(71) Applicant: POTIX CORPORATION, Taipei (TW)

(72) Inventors: Chih-Heng Chen, Taipei (TW); Jen-Feng Chao, Taipei (TW); Wenning Hsu, Taipei (TW); Ming-Shia Yeh, Taipei (TW)

(73) Assignee: POTIX CORPORATION, Taipei (TW)

( * ) Notice: Subject to any disclaimer, the term of this patent is extended or adjusted under 35 U.S.C. 154(b) by 289 days.

(21) Appl. No.: 18/130,030

(22) Filed: Apr. 3, 2023

(65) Prior Publication Data
US 2024/0169615 A1    May 23, 2024

(30) Foreign Application Priority Data
Nov. 22, 2022  (CN) .......................... 202211465382.6

(51) Int. Cl.
*G06T 11/20* (2006.01)
*G06F 40/18* (2020.01)
*G06F 40/205* (2020.01)

(52) U.S. Cl.
CPC ............ *G06T 11/206* (2013.01); *G06F 40/18* (2020.01); *G06F 40/205* (2020.01)

(58) Field of Classification Search
CPC ...... G06T 11/206; G06F 40/18; G06F 40/205; G06F 16/353
See application file for complete search history.

(56) References Cited

U.S. PATENT DOCUMENTS

| | | | |
|---|---|---|---|
| 5,461,708 A * | 10/1995 | Kahn | G06F 40/18 345/440 |
| 2013/0080444 A1* | 3/2013 | Wakefield | G06T 11/206 707/E17.084 |
| 2013/0097177 A1* | 4/2013 | Fan | G06F 16/438 707/805 |
| 2013/0145244 A1* | 6/2013 | Rothschiller | G06F 40/18 715/212 |
| 2018/0088753 A1* | 3/2018 | Viégas | G06F 3/0482 |
| 2020/0250472 A1* | 8/2020 | Abhyankar | G06F 18/2411 |
| 2020/0372077 A1* | 11/2020 | Religa | G06F 40/18 |

* cited by examiner

*Primary Examiner* — Jeffery A Brier
(74) *Attorney, Agent, or Firm* — Birch, Stewart, Kolasch & Birch, LLP (57) ABSTRACT

An electronic device and a non-transitory computer-readable storage medium are provided. The electronic device includes a storage module and a processing module. The storage module is configured to store at least one program instruction. The processing module is coupled to the storage module, and is configured to load the at least one program instruction to perform the following steps: parsing a plurality of cells in an analysis area in a data sheet to identify each of the cells as a formula cell or a non-formula cell; classifying the formula cells so that the formula cells having similar formula expressions fall into the same formula group; analyzing a formula structure of the formula expressions of each formula group to output at least one recommended chart option.

20 Claims, 6 Drawing Sheets

| | A | B | C | D | E | F |
|---|---|---|---|---|---|---|
| 1 | Profit and loss | Q1 | Q2 | Q3 | Q4 | All year |
| 2 | Revenue | $478,654 | $700,323 | $704,654 | $673,723 | =SUM(B2:E2) |
| 3 | Cost of goods sold | $38,982 | $50,552 | $70,706 | $64,923 | =SUM(B3:E3) |
| 4 | Gross profit | =B2-B3 | =C2-C3 | =D2-D3 | =E2-E3 | =SUM(B4:E4) |
| 5 | | | | | | |
| 6 | Expense | | | | | |
| 7 | Research and development | $54,600 | $86,550 | $134,200 | $90,100 | =SUM(B7:E7) |
| 8 | Marketing | $120,400 | $349,900 | $355,350 | $330,250 | =SUM(B8:E8) |
| 9 | Management | $244,783 | $160,316 | $140,660 | $99,992 | =SUM(B9:E9) |
| 10 | Total expense | =B7+B8+B9 | =C7+C8+C9 | =D7+D8+D9 | =E7+E8+E9 | =SUM(B10:E10) |
| 11 | | | | | | |
| 12 | Net profit | =B4-B10 | =C4-C10 | =D4-D10 | =E4-E10 | =SUM(B12:E12) |

ELECTRONIC DEVICE AND NON-TRANSITORY COMPUTER-READABLE STORAGE MEDIUM

CROSS-REFERENCE TO RELATED APPLICATION

This non-provisional application claims priority under 35 U.S.C. § 119(a) to Patent Application No. 202211465382.6 filed in China, P.R.C. on Nov. 22, 2022, the entire contents of which are hereby incorporated by reference.

BACKGROUND

Technical Field

The invention relates to an electronic device and a non-transitory computer-readable storage medium, and in particular, to an electronic device and a non-transitory computer-readable storage medium that can provide an appropriate recommended chart option according to a formula expression in a data sheet.

Related Art

In the commercial field, people continuously collect data (for example, operational data) in order to help make decisions. Because people cannot intuitively understand the meaning behind the collected data, people usually summarize and output the collected data as a chart, so that people can intuitively interpret the meaning behind the data through visual charts to assist in adjustment and formulation of the decisions.

SUMMARY

In view of this, in some embodiments, an electronic device is provided, including a storage module and a processing module. The storage module is configured to store at least one program instruction. The processing module is coupled to the storage module, and is configured to load the at least one program instruction to perform the following steps: parsing a plurality of cells in an analysis area in a data sheet to identify each of the cells as a formula cell or a non-formula cell; classifying the formula cells so that the formula cells having similar formula expressions fall into the same formula group; analyzing a formula structure of the formula expressions of each formula group to output at least one recommended chart option.

In some embodiments, the similar formula expressions mean that the formula expressions have the same formula structure and the same cell offsets.

In some embodiments, the processing module further performs the following steps: forming at least one data sequence according to data of a plurality of reference cells to which the formula cells in the same formula group refer; and displaying a detailed chart comprising the at least one data sequence according to the selected recommended chart option.

In some embodiments, the processing module further performs the following steps: selecting at least one cell as a drill-down object and performing drill-down according to the drill-down object to generate another detailed chart.

In some embodiments, the processing module further performs the following step: obtaining at least one data series label and at least one data category label according to at least one column data sequence and at least one row data sequence corresponding to the formula group.

In some embodiments, when the formula expression of the formula group is a subtraction relation, the recommended chart option is any or any combination of a bar chart, a column chart, a line percentage chart, a bar percentage chart, and a column percentage chart.

In some embodiments, when the formula expression of the formula group is an addition relation, the recommended chart option is any or any combination of a stacked area chart, a pie chart, a donut chart, a stacked bar chart, a stacked column chart, a bar chart, and a column chart.

In some embodiments, when the formula expression of the formula group is a multiplication relation or a division relation, the recommended chart option is any or any combination of a combined line and bar chart and a combined line and column chart.

In some embodiments, when the formula expression of the formula group comprises a statistical relation, the recommended chart option is any or any combination of a line chart, a pie chart, a bar chart, an area chart, a column chart, a histogram, a scatter diagram, and a bell curve.

In some embodiments, the formula group is the statistical relation, and the statistical relation is: a count function, where the recommended chart option is any or any combination of the line chart, the bar chart, the column chart, and the pie chart; a unique function, where the recommended chart option is any or any combination of the line chart, the bar chart, the column chart, and the pie chart; an average function, where the recommended chart option is any or any combination of the line chart, the bar chart, the column chart, the area chart, the histogram, the scatter diagram, and the bell curve; a minimum (Min) function, where the recommended chart option is any or any combination of the line chart, the bar chart, and the column chart; a maximum (Max) function, where the recommended chart option is any or any combination of the line chart, the bar chart, and the column chart; a median function, where the recommended chart option is any or any combination of the line chart, the bar chart, the column chart, the area chart, the histogram, the scatter diagram, and the bell curve; a standard deviation (StdDev) function, where the recommended chart option is any or any combination of the line chart, the bar chart, the column chart, the area chart, the histogram, the scatter diagram, and the bell curve; and a variance function, where the recommended chart option is any or any combination of the line chart, the bar chart, the column chart, the histogram, the scatter diagram, the bell curve, and the area chart.

In some embodiments, a non-transitory computer-readable storage medium, storing at least one program instruction, and an electronic device loads the at least one program instruction to perform the following steps: parsing a plurality of cells in an analysis area in a data sheet to identify each of the cells as a formula cell or a non-formula cell; classifying the formula cells so that the formula cells having similar formula expressions fall into the same formula group; and analyzing a formula structure of the formula expressions of each formula group to output at least one recommended chart option.

Various embodiments are provided below for detailed description. However, the embodiments are merely used as examples for illustration and do not limit the protection scope of the present invention. In addition, some elements are omitted in the drawings in the embodiments to clearly show the technical features of the present invention. The same reference numeral is used to indicate the same or similar elements in all of the drawings.

DETAILED DESCRIPTION

Figure 1:
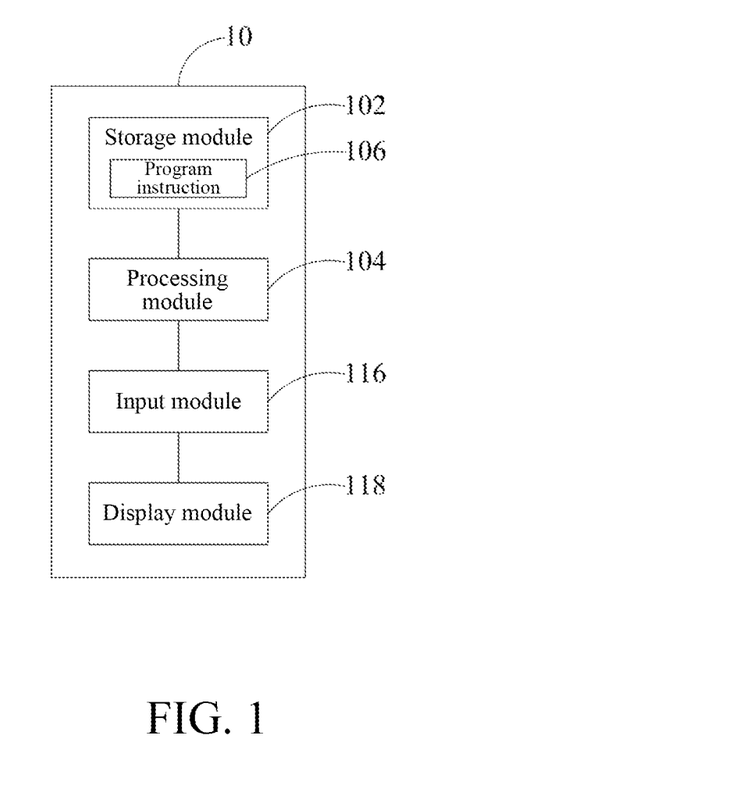
FIG. 1 is a block diagram of an electronic device according to some embodiments of the present invention.
Figure 2:
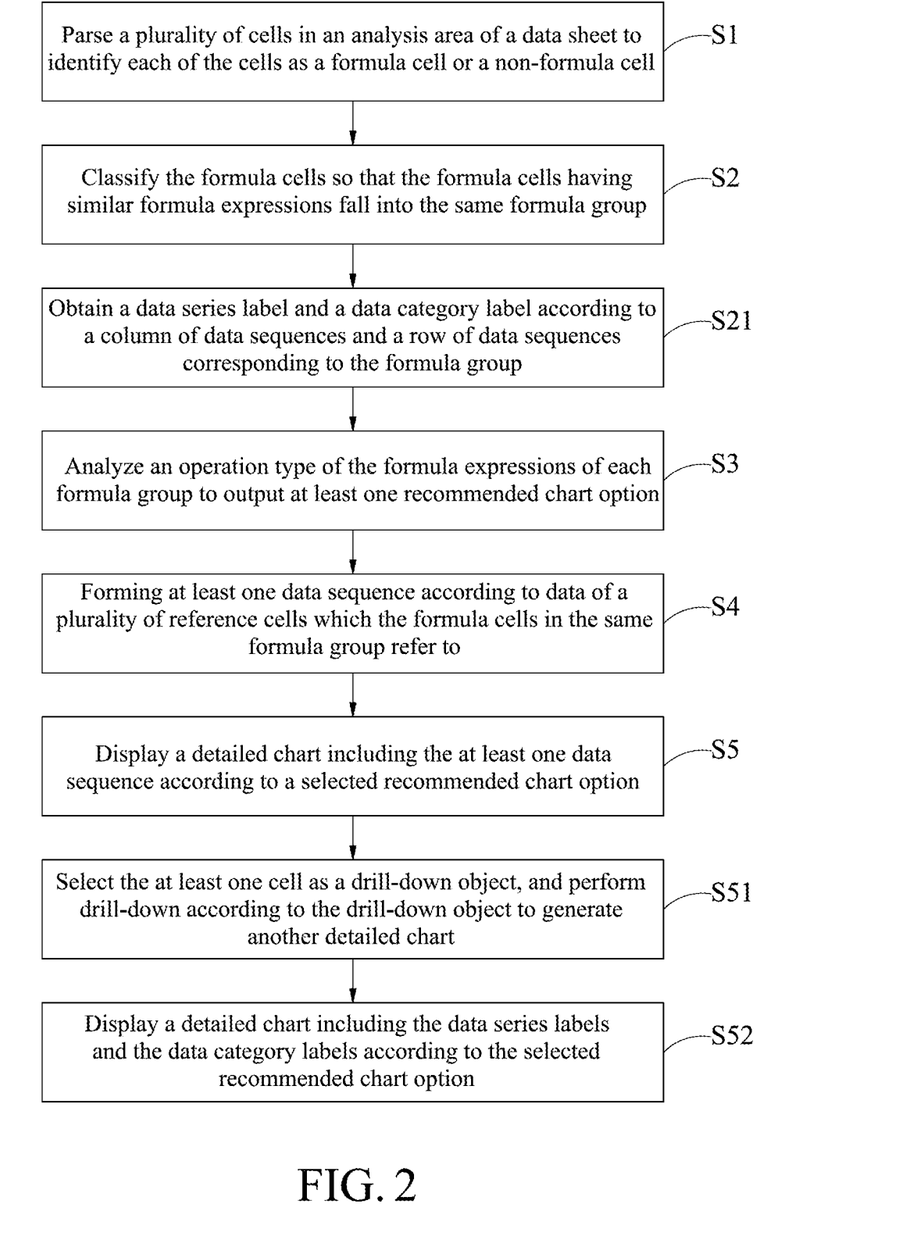
FIG. 2 is a diagram of the steps of a processing module executing at least one program instruction according to some embodiments of the present invention.
Figure 3:
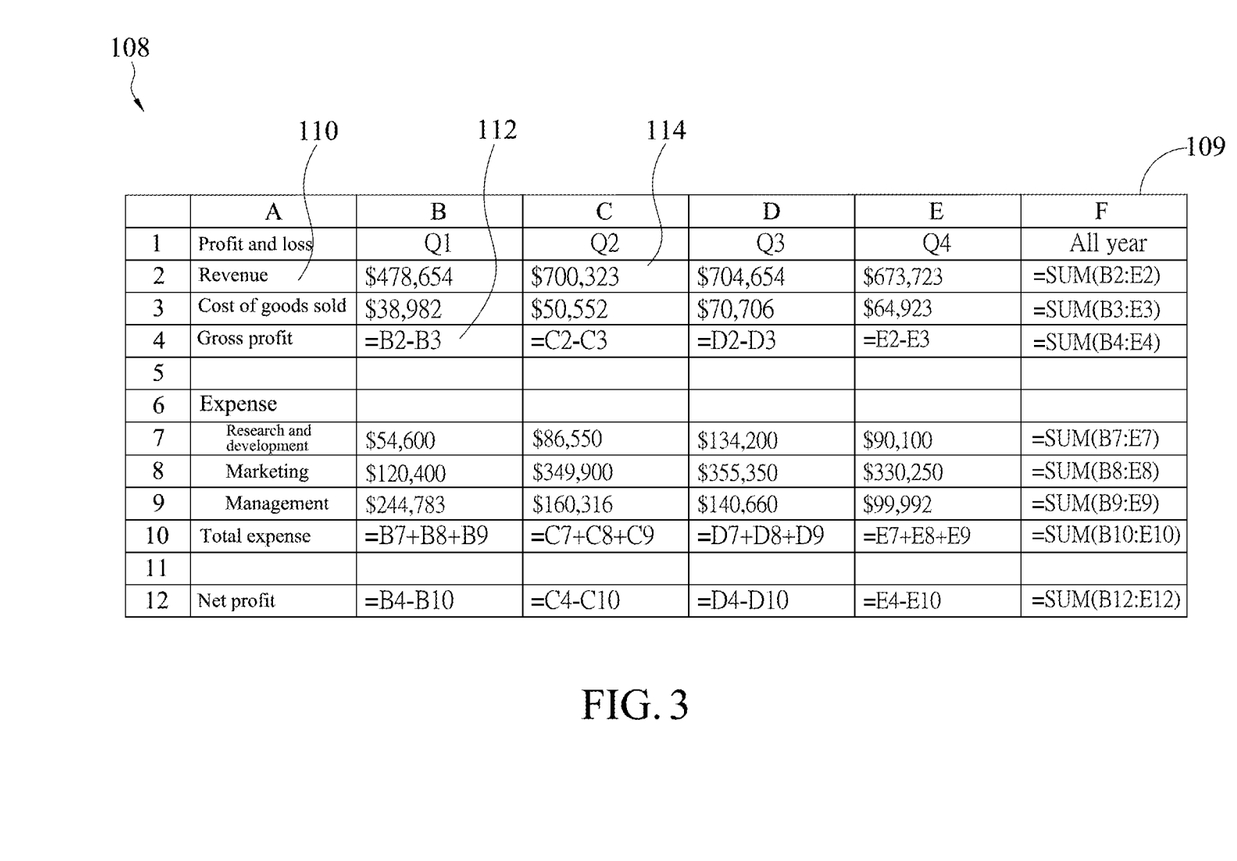
FIG. 3 is a schematic diagram of processing a data sheet according to at least one program instruction according to some embodiments of the present invention.

Refer to FIG. 1, FIG. 2, and FIG. 3. FIG. 1 is a block diagram of an electronic device according to some embodiments of the present invention. FIG. 2 is a diagram of the steps of a processing module executing at least one program instruction according to some embodiments of the present invention. FIG. 3 is a schematic diagram of processing a data sheet according to at least one program instruction according to some embodiments of the present invention. As shown in FIG. 1 to FIG. 3, an electronic device 10 includes a storage module 102 and a processing module 104. The storage module 102 is configured to store at least one program instruction 106. The processing module 104 is coupled to the storage module 102 and is configured to load the at least one program instruction 106 to perform the following steps: parsing a plurality of cells 110 in an analysis area 109 of a data sheet 108 to identify each of the cells 110 as a formula cell 112 or a non-formula cell 114 (step S1 in FIG. 2); classifying the formula cells 112 so that the formula cells 112 having similar formula expressions fall into the same formula group (step S2 in FIG. 2); and analyzing a formula structure of the formula expressions of each formula group (to be described later) to output at least one recommended chart option (step S3 in FIG. 2). In order to clearly describe a specified cell 110 below, a column number and a row number of the specified cell 110 are used to represent the specified cell 110. For example, a cell 110 in column B and row 2 is represented as a cell B2, a cell 110 in column C and row 4 is represented as a cell C4, and so on.

The electronic device 10 may be, for example, a computer device that can execute at least one program instruction. In some embodiments, the electronic device 10 includes an input module 116 and a display module 118. The input module 116 may generate operation information to edit the data sheet 108 or give an operation instruction. The input module 116 may be, for example, a keyboard, a mouse, or a touch panel. The display module 118 may display the data sheet 108 and a recommended chart option. The display module 118 may be, for example, a screen or a touch panel.

The storage module 102 may be, for example, a non-transitory computer-readable storage medium. The non-transitory computer-readable storage medium may be a hard disk drive (HDD), a solid-state drive (SSD), a read-only memory (ROM), or a compact disc read-only memory (CD-ROM). The storage module 102 may store the data sheet 108. In some embodiments, the data sheet 108 may not be stored in the storage module 102. For example, the data sheet 108 may be stored in a cloud storage space, a webpage space, or the like.

The processing module 104 may be, for example, a central processing unit (CPU) or a processor of an ARM instruction set. The processing module 104 may read and execute at least one program instruction 106, and edit and display the data sheet 108 on the display module 118 according to the operation information.

The at least one program instruction 106 can be pre-stored in the storage module 102 so that the processing module 104 can process the data sheet 108 according to the execution step of the at least one program instruction 106 after loading the at least one program instruction 106.

The data sheet 108 may be, for example, a spreadsheet. The spreadsheet is, for example, an XLSX file, an XLS file, or an ODS file. As shown in FIG. 3, the data sheet 108 has a plurality of cells 110, and each of the cells 110 may be classified as a formula cell 112 or a non-formula cell 114 according to entered data. The formula cell 112 may mean that the cell 110 includes a formula expression (for example, a formula expression of a cell B12 in FIG. 3 is "=B4–B10"). On the contrary, the non-formula cell 114 may mean that the cell 110 simply records text, number, or a combination of text and number (for example, a cell C2 or a cell C1 in FIG. 3). The data sheet 108 includes one or more analysis areas 109. In some embodiments, the analysis area 109 may be determined by a user by operating the input module 116 to select a range.

In some embodiments, the processing module 104 may rewrite the formula expression from an A1 notation to an R1C1 notation, and use the same R1C1 notation for grouping formula cells into formula groups.

In step S1, the processing module 104 analyzes each cell 110 in the analysis area 109 of the data sheet 108. When a formula expression is recorded in the cell 110, the processing module 104 determines that the cell 110 is the formula cell 112. When the cell 110 records only number, text, or a combination of number and text, the processing module 104 determines that the cell 110 is the non-formula cell 114. As shown in FIG. 3, in a range of cells (A1:F12) (the cells (A1:F12) indicate all cells 110 from a cell A1 to a cell F12) in the analysis area 109, cells (B4:E4), cells (B10:E10), cells (B12:E12), cells (F2:F4), cells (F7:F10), and the cell F12 are formula cells 112, and the remaining cells 110 are non-formula cells 114. Specifically, the cell B3 and the cell B4 are used as examples. The combination of number and text recorded in the cell B3 is "$38,982", and therefore the processing module 104 determines that the cell B3 is the non-formula cell 114. A formula expression recorded in the cell B4 is "=B2–B3", and therefore the processing module 104 determines that the cell B4 is the formula cell 112.

Step S2 is further described herein. The formula group may include a column formula group, a row formula group, or a single cell formula group. The column formula group may mean a set of formula cells 112 located in the same column having similar formula expressions. The row formula group may mean a set of formula cells 112 located in the same row and having similar formula expressions. The single cell formula group may mean that the formula cell is located only in a single formula cell 112 in a column and a row different from other formula cells 112, or that the formula expression of the formula cell 112 is not similar to formula expressions of other formula cells 112 in the same column or the same row.

In some embodiments, the similar formula expressions may mean that the formula expressions have the same formula structure and the same cell offsets. The formula structure may mean a structure of a formula expression (for example, "=A*B", "=A+B", or "=SUM (A, B, C, D)") and/or an operation relation. The operation relation may include a subtraction relation, an addition relation, a multiplication relation, a division relation, a magnitude relation, or a statistical relation. The cell offsets may mean a column offset and a row offset from the formula cell 112 to the cells 110 which the formula expression refers to.

The cells (B4:E4) are used as an example. The cells (B4:E4) are all formula cells 112. The formula expression of the formula cell B4 is "=B2–B3", the formula expression of the formula cell C4 is "=C2–C3", the formula expression of the formula cell D4 is "=D2–D3", and the formula expression of the formula cell E4 is "=E2–E3". The formula cells (B4:E4) have similar formula expressions (the only difference is that the cells 110 which the formula expression refers to are different), and the cells 110 in the formula expressions which the formula cells (B4:E4) refer to all have a row offset of –2 and a column offset of 0. Therefore, the formula cells (B4:E4) belong to the same formula group. In addition, the cells (B4:E4) are all in row 4, and therefore the cells (B4:E4) belong to the same row formula group.

The cells (B10:E10) are used as an example. The cells (B10:E10) are all formula cells 112. The formula expression of the formula cell B10 is "=B7+B8+B9", the formula expression of the formula cell C10 is "=C7+C8+C9", the formula expression of the formula cell D10 is "=D7+D8+D9", and the formula expression of the formula cell E10 is "=E7+E8+E9". The formula cells (B10:E10) have similar formula expressions, and the cells 110 in the formula expressions which the formula cells (B10:E10) refer to all have a row offset of –3 and a column offset of 0. Therefore, the formula cells (B10:E10) belong to the same formula group. In addition, the formula cells (B10:E10) are all in row 10, and therefore the formula cells (B10:E10) belong to the same row formula group.

The cells (F2:F4), the cells (F7:F10), and the cell F12 are used as examples. The cells (F2:F4), the cells (F7:F10), and the cell F12 are all formula cells. The formula expression of the formula cell F2 is "=SUM (B2:E2)", the formula expression of the formula cell F3 is "=SUM (B3:E3)", the formula expression of the formula cell F4 is "=SUM (B4:E4)", the formula expression of the formula cell F7 is "=SUM (B7:E7)", the formula expression of the formula cell F8 is "=SUM (B8:E8)", the formula expression of the formula cell F9 is "=SUM (B9:E9)", the formula expression of the formula cell F10 is "=SUM (B10:E10)", and the formula expression of the formula cell F12 is "=SUM (B12:E12)". The formula cells (F2:F4), the formula cells (F7:F10), and the formula cell F12 have similar formula expressions, and the cells 110 in the formula expressions which the formula cells (F2:F4), the formula cells (F7:F10), and the formula cell F12 refer to all have a row offset of 0 and a column offset of –4. Therefore, the formula cells (F2:F4), the formula cells (F7:F10), and the formula cell F12 belong to the same formula group. In addition, the formula cells (F2:F4), the formula cells (F7:F10), and the formula cell F12 are all in column F. Therefore, the formula cells (F2:F4), the formula cells (F7:F10), and the formula cell F12 belong to the same column formula group.

Step S3 is further described herein. The formula structure may include a formula style. The formula style may mean various formulas provided by the data sheet 108, for example, "=SUM (A, B, C, D)", "=A+B", or "=A*B". After analyzing the formula structure of the formula expression, the processing module 104 may screen out one or more recommended chart options suitable for the formula structure. The recommended chart option may be at least one chart template presented in the data sheet 108, for example, one or more than two chart templates such as a stacked area chart, a pie chart, a donut chart, a stacked bar chart, a stacked column chart, a bar chart, a column chart, a combined line and bar chart, a combined line and column chart, a line chart or an area chart, a histogram, a scatter diagram, a line percentage chart, a column percentage chart, a bar percentage chart, or a bell curve. The recommended chart option may be displayed in the data sheet 108 as a preview chart (which may be displayed within or next to the data sheet 108), or listed in the data sheet 108 as a text bar (which may be displayed within or next to the data sheet 108).

In some embodiments, the processing module 104 further performs the following steps: forming at least one data sequence according to data of a plurality of reference cells to which the formula cells 112 in the same formula group refer (step S4 shown in FIG. 2); and displaying a detailed chart including the at least one data sequence according to a selected recommended chart option (step S5 shown in FIG. 2). The data of the reference cell may be data of the formula cell 112 or the non-formula cell 114 which the formula expression refers to (the data may be a number, a text, or a formula expression). Specifically, the data sequence includes at least one column data sequence and at least one row data sequence.

The cell B4 is used as an example. The cell B4 is one of the formula cells 112. The formula expression of the formula cell B4 is "=B2–B3", and therefore the formula cell B4 refers to the cell B2 and the cell B3. The processing module 104 further checks the cell B2 and the cell B3. Data entered in the cell B2 is "$478,654", and data entered in the cell B3 is "$38,982". The processing module 104 respectively enters the data of cells (B2:E2) and cells (B3:E3) in the row data sequences.

The cell B10 is used as an example. The cell B10 is one of the formula cells 112. The formula expression of the formula cell B10 is "=B7+B8+B9", and therefore the formula cell B10 refers to the cell B7, the cell B8, and the cell B9. The processing module 104 further checks the cell B7, the cell B8, and the cell B9. Data entered in the cell B7 is "$54,600", data entered in the cell B8 is "$120,400", and data entered in the cell B9 is "$244,783". The processing module 104 respectively enters the data of cells (B7:E7), cells (B8:E8), and cells (B9:E9) in the row data sequences.

The cell B12 is used as an example. The cell B12 is one of the formula cells 112. The formula expression of the formula cell B12 is "=B4–B10", and therefore the formula cell B12 refers to the formula cell B4 and the formula cell B10. The processing module 104 respectively enters the data (which may be formula calculation results) of the formula cells (B4:E4) and the formula cells (B10:E10) in the row data sequences.

Step S5 is further described herein. When the recommended chart option of one formula group is selected, the processing module 104 reads the data sequences (column data sequences and/or row data sequences) corresponding to the formula group, and loads the data in the data sequences (the column data sequences and/or the row data sequences) into the selected recommended chart option to create a detailed chart (for example, the detailed chart 120 shown in FIG. 4).

In some embodiments, the processing module 104 further performs the following steps: selecting at least one cell 110 as a drill-down object and performing drill-down according to the drill-down object to generate another detailed chart (step S51 shown in FIG. 2). The drill-down object may be the formula cell 112 or the non-formula cell 114 or any data point in the detailed chart (that is, the formula cell 112 or the non-formula cell 114 corresponding to the data point in the detailed chart). Specifically, in order to obtain more information about the corresponding formula cell 112 or non-formula cell 114 in the detailed chart, a user may select at least one formula cell 112 or at least one non-formula cell 114 from the detailed chart, or may select at least one formula cell 112 or at least one non-formula cell 114 from the data sheet 108 corresponding to the detailed chart. The processing module 104 may perform a drill-down according to the reference path of the selected formula cell 112, or perform a drill-down according to the position of the non-formula cell 114, so as to obtain the data sequences corresponding to the selected formula cell 112 or non-formula cell 114, and generate another detailed chart from the data sequences corresponding to the selected formula cell 112 or non-formula cell 114.

The range of the analysis area 109 is (A1:F4) by way of example. When the cell F2 is selected as the drill-down object, the processing module 104 may identify the cell F2 as the formula cell 112. The formula expression of the formula cell F2 is "=SUM (B2:E2)". Therefore, the formula cell F2 refers to the cell B2 ($478,654), the cell C2 ($700,323), the cell D2 ($704,654), and the cell E2 ($673,723). The processing module 104 further enters the data of the cells (B2:E2) in the row data sequence, and creates another detailed chart accordingly.

The range of the analysis area 109 is (A12:E12) by way of example. When the cell B12 is selected as the drill-down object, the processing module 104 may identify the cell B12 as the formula cell 112. The formula expression of the formula cell B12 is "=B4−B10". Therefore, the formula cell B12 refers to the cell B4 and the cell B10. The processing module 104 further identifies the cell B4 and the cell B10 as the formula cells 112. The formula expression of the formula cell B4 is "=B2−B3", and the formula expression of the formula cell B10 is "=B7+B8+B9". Therefore, the formula cell B4 further refers to the cell B2 ($478,654) and the cell B3 ($38,982), and the formula cell B10 further refers to the cell B7 ($54,600), the cell B8 ($120,400), and the cell B9 ($244,783). The processing module 104 enters the data of the cells (B2:E2), the cells (B3:E3), the cells (B7:E7), the cells (B8:E8), and cells (B9:E9) in the row data sequences, and creates another detailed chart accordingly.

The non-formula cell 114 is used as the drill-down object by way of example. When the cell C2 is selected as the drill-down object, the processing module 104 may identify the cell C2 as the non-formula cell 114. Since the non-formula cell C2 is located at the intersection of the row data sequence (B2:E2) in row 2 and a column data sequence (C2:C3) in column C, the processing module 104 may start drill-down according to at least one column data sequence or at least one row data sequence where the non-formula cell C2 is located (to be described later). The formula cell F2 that is also in row 2 may be found from the row data sequence (B2:E2) in the row 2. The formula expression of the formula cell F2 is "=SUM (B2:E2)", and the processing module 104 may recommend corresponding charts according to the addition relation of the formula expression (to be described later), for example, a pie chart with "Revenue" in four quarters of "Q1", "Q2", "Q3", and "Q4". Then, the formula cell C4 that is also located in column C may be found from the column data sequence (C2:C3) in column C. The formula expression of the formula cell C4 is "=C2−C3", and the processing module 104 may recommend corresponding charts according to the subtraction relation of the formula expression (to be described later), for example, column charts of "Revenue" and "Cost of goods sold" in "Q1".

In some embodiments, the processing module 104 further performs the following step: obtaining at least one data series label and at least one data category label according to at least one column data sequence and at least one row data sequence corresponding to the formula group (step S21 in FIG. 2). When the formula group is a column formula group, the at least one data series label of the column data sequence is obtained according to the at least one column data sequence which the column formula group refers to, and the at least one data category label of the at least one row data sequence is obtained according to the at least one row data sequence corresponding to all formula cells 112 of the column formula group. When the formula group is a row formula group, the at least one data series label of the row data sequence is obtained according to the at least one row data sequence which the row formula group refers to, and the at least one data category label of the at least one column data sequence is obtained according to the at least one column data sequence corresponding to all formula cells 112 of the row formula group. When the formula group is a single cell formula group, and the single cell formula group is in the same row as the cell 110 which the formula group refers to, at least one data series label of the column data sequence is obtained according to the at least one column data sequence which the single cell formula group refers to, and at least one data category label of the row data sequence is obtained according to at least one row data sequence corresponding to the formula cells 112 of the single cell formula group. When the formula group is a single cell formula group, and the single cell formula group is in the same column as the cell 110 which the formula group refers to, at least one data series label of the row data sequence is obtained according to the at least one row data sequence which the single cell formula group refers to, and at least one data category label of the column data sequence is obtained according to at least one column data sequence corresponding to the formula cells 112 of the single cell formula group (to be described later).

In some embodiments, the processing module 104 further performs the following step: displaying a detailed chart including the data series labels and the data category labels according to a selected recommended chart option (step S52 in FIG. 2). Specifically, when the recommended chart option of one formula group is selected, the processing module 104 reads and displays the data series labels and the data category labels of the data sequences (column data sequences and row data sequences) corresponding to the formula group in the detailed chart.

A row formula group (B4:E4) is used as an example. The row formula group (B4:E4) is in row 4. Therefore, the data series label of the row formula group (B4:E4) is "Gross profit" corresponding to row 4 in the row data sequence. The column data sequence corresponding to each formula cell 112 of the row formula group (B4:E4) is column B, column C, column D, and column E. Therefore, the data category labels of the row formula group (B4:E4) are "Q1" corresponding to column B, "Q2" corresponding to column C, "Q3" corresponding to column D, and "Q4" corresponding to column E. In addition, the row formula group (B4:E4) refers to the cells (B2:E2) in row 2 and the cells (B3:E3) in row 3. Therefore, the row data sequences that the row formula group (B4:E4) refers to are row 2 and row 3. The data series label corresponding to the cells (B2:E2) in row 2 is "Revenue" of the row data sequence, and the data series label corresponding to the cells (B3:E3) in row 3 is "Cost of goods sold" of the row data sequence.

A row formula group (B10:E10) is used as an example. The row formula group (B10:E10) is in row 10. Therefore, the data series label of the row formula group (B10:E10) is "Total expense" corresponding to row 10 in the row data sequence. The column data sequence corresponding to each formula cell 112 of the row formula group (B10:E10) is column B, column C, column D, and column E. Therefore, the data category labels of the row formula group (B10:E10) are "Q1" corresponding to column B, "Q2" corresponding to column C, "Q3" corresponding to column D, and "Q4" corresponding to column E. In addition, the row formula group (B10:E10) refers to the cells (B7:E7) in row 7, the cells (B8:E8) in row 8, and the cells (B9:E9) in row 9. Therefore, the row data sequences that the row formula group (B10:E10) refers to are row 7, row 8, and row 9. The data series label corresponding to the cells (B7:E7) in row 7 is "Research and development" of the row data sequence, the data series label corresponding to the cells (B8:E8) in row 8 is "Marketing" of the row data sequence, and the data series label corresponding to the cells (B9:E9) in row 9 is "Management" of the row data sequence.

A row formula group (B12:E12) is used as an example. The row formula group (B12:E12) is in row 12. Therefore, the data series label of the row formula group (B12:E12) is "Net profit" corresponding to row 12 in the row data sequence. The column data sequence corresponding to each formula cell 112 of the row formula group (B12:E12) is column B, column C, column D, and column E. Therefore, the data category labels of the row formula group (B10:E10) are "Q1" corresponding to column B, "Q2" corresponding to column C, "Q3" corresponding to column D, and "Q4" corresponding to column E. In addition, the row formula group (B12:E12) refers to the cells (B4:E4) in row 4 and the cells (B10:E10) in row 10. Therefore, the row data sequences that the row formula group (B12:E12) refers to are row 4 and row 10. The data series label corresponding to the cells (B4:E4) in row 4 is "Gross profit" of the row data sequence, and the data series label corresponding to the cells (B10:E10) in row 10 is "Total expense" of the row data sequence.

A column formula group (F2:F4, F7:F10, F12) is used as an example. The column formula group (F2:F4, F7:F10, F12) is in column F. Therefore, the data series label of the column formula group (F2:F4, F7:F10, F12) is "All year" corresponding to column F in the column data sequence. The row data sequences corresponding to all formula cells of the column formula group (F2:F4, F7:F10, F12) are row 2 to row 4, row 7 to row 10, and row 12. Therefore, the data category labels of the column formula group (F2:F4, F7:F10, F12) are "Revenue" corresponding to row 2, "Cost of goods sold" corresponding to row 3, "Gross profit" corresponding to row 4, "Research and development" corresponding to row 7, "Marketing" corresponding to row 8, "Management" corresponding to row 9, "Total expense" corresponding to row 10, and "Net profit" corresponding to row 12. The column formula group (F2:F4, F7:F10, F12) refers to cells (B2:B4, B7:B10, B12) in column B, cells (C2:C4, C7:C10, C12) in column C, cells (D2:D4, D7:D10, D12) in column D, and cells (E2:E4, E7:E10, E12) in column E. Therefore, columns of the data sequences that the column formula group (F2:F4, F7:F10, F12) refers to are column B, column C, column D, and column E. The data series label corresponding to the cells (B2:B4, B7:B10, B12) is "Q1" in column B, the data series label corresponding to the cells (C2:C4, C7:C10, C12) is "Q2" in column C, the data series label corresponding to the cells (D2:D4, D7:D10, D12) is "Q3" in column D, and the data series label corresponding to the cells (E2:E4, E7:E10, E12) is "Q4" in column E.

Figure 4:
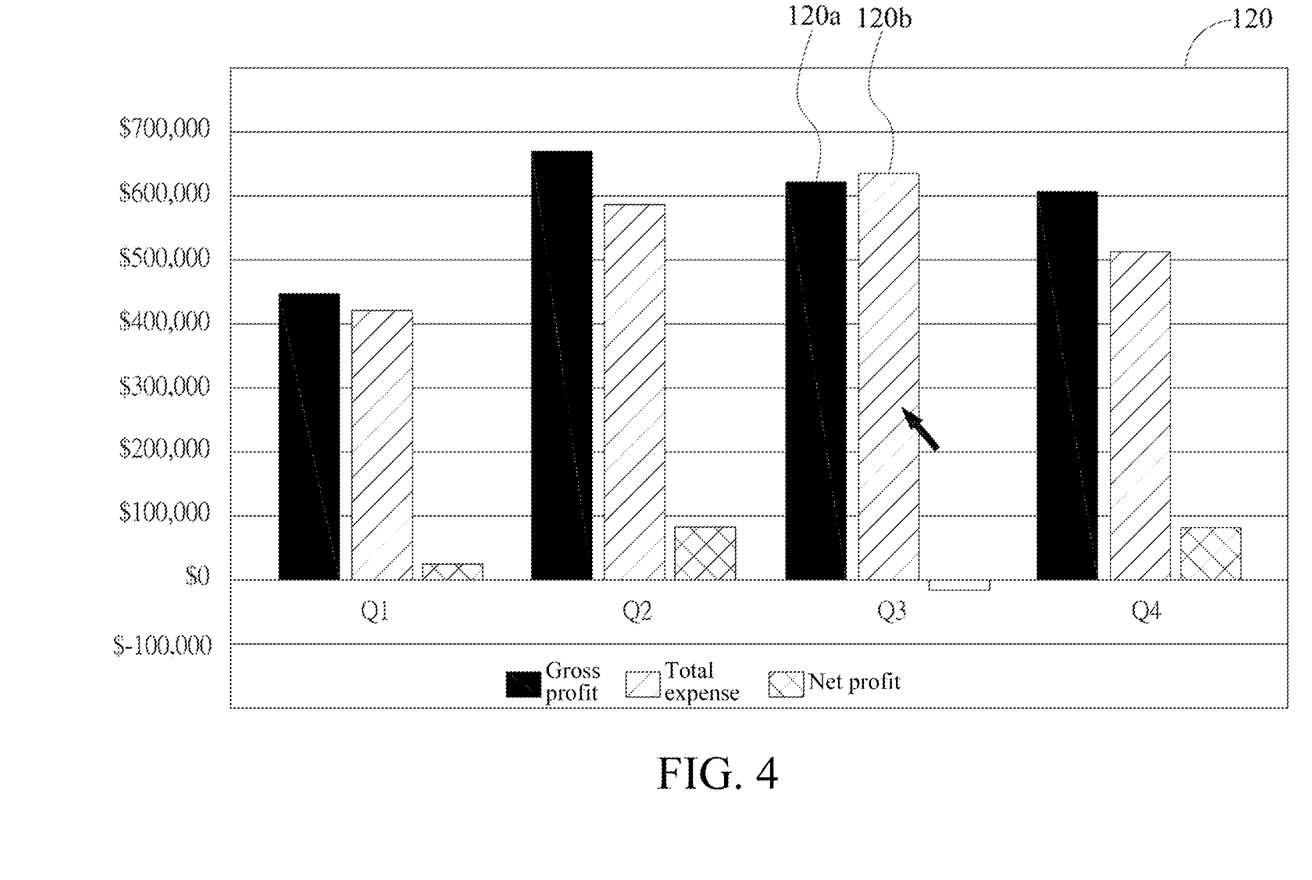
FIG. 4 is a detailed chart created according to the data sheet of FIG. 3, where the detailed chart is a schematic diagram of a bar chart.

Refer to FIG. 1 to FIG. 4 together. FIG. 4 is a detailed chart created according to the data sheet of FIG. 3, where the detailed chart is a schematic diagram of a bar chart. In some embodiments, when the formula expression of the formula group is a subtraction relation, the recommended chart option may be selected from one or more of a bar chart, a column chart, a line percentage chart, a column percentage chart, and a bar percentage chart. Specifically, the formula structure of the formula expression is "=A−B", and an operation relation of the formula expression is the subtraction relation. In chart and data analysis, when the formula expression is the subtraction relation, it indicates that another number is subtracted from one number, so as to compare the two numbers, that is, to analyze the difference and the change rate of the original numbers. Therefore, the recommended chart option may be selected from one or more of the bar chart, the column chart, the line percentage chart, the column percentage chart, or the bar percentage chart, and a user may learn the difference and the change rate of the original numbers according to the recommended chart option.

A range of the analysis area 109 is (A1:E4) by way of example. The processing module 104 may identify a row formula group (B4:E4) existing in the range (A1:E4). The formula expression of the formula cell B4 is "=B2−B3", that is, "Revenue" of "Q1" minus "Cost of goods sold" of "Q1", and therefore the operation relation of the row formula group (B4:E4) is the subtraction relation. The recommended chart option may be selected from one or more of the bar chart, the column chart, the line percentage chart, the column percentage chart, and the bar percentage chart. Moreover, the row formula group (B4:E4) is in row 4. Therefore, the data series label of the row formula group (B4:E4) is "Gross profit" corresponding to row 4 in the row data sequence. In addition, the row formula group (B4:E4) refers to the row data sequences in row 2 and row 3. Therefore, the data series label further includes "Revenue" corresponding to the data sequence in row 2 and "Cost of goods sold" corresponding to the data sequence in row 3. In addition, the column data sequences corresponding to each formula cell 112 of the row formula group (B4:E4) are in column B, column C, column D, and column E, and therefore the data category labels are "Q1", "Q2", "Q3", and "Q4" of the corresponding column data sequence in each column, respectively. The range of the analysis area 109 is (A12:E12) by way of example. The processing module 104 may identify a row formula group (B12:E12) existing in the range (A12:E12). The formula expression of the formula cell B12 is "=B4−B10", that is, "Gross profit" of "Q1" minus "Total expense" of "Q1", and therefore the operation relation of the row formula group (B12:E12) is the subtraction relation. The recommended chart option may be selected from one or more of the bar chart, the column chart, the line percentage chart, the column percentage chart, and the bar percentage chart. Moreover, the row formula group (B12:E12) is in row 12. Therefore, the data series label of the row formula group (B12:E12) is "Net profit" corresponding to the row data in row 12. In addition, the row formula group (B12:E12) refers to the row data sequences in row 4 and row 10. Therefore, the data series labels further include "Gross profit" corresponding to the data sequence in row 4 and "Total expense" corresponding to the data sequence in row 10. In addition, the column data sequences corresponding to each formula cell 112 of the row formula group (B12:E12) are column B, column C, column D, and column E, and therefore the data category labels are "Q1", "Q2", "Q3", and "Q4" of the corresponding column data sequence in each column, respectively.

In some embodiments, if the formula cell B12 is selected as the drill-down object, the processing module 104 can find that the formula expression of the formula cell B12 refers to the formula cell B4 and the formula cell B10. The formula cell B4 and the formula cell B10 respectively correspond to the row formula group (B4:E4) and the row formula group (B10:E10), and the corresponding data category labels are "Q1", "Q2", "Q3", and "Q4" of the corresponding column data sequence. Therefore, the "Gross profit" from the first quarter to the fourth quarter (which are data category labels "Q1" to "Q4") form one data sequence, and the "Total expense" from the first quarter to the fourth quarter form another data sequence. The processing module 104 may apply the data series labels and the data category labels to the selected recommended bar chart option to generate a detailed bar chart 120 including the data series labels ("Gross profit", "Total expense", and "Net profit") and the data category labels ("Q1", "Q2", "Q3", and "Q4"). Referring to FIG. 4 again, the detailed chart 120 shows clustered bar charts of "Gross profit" and "Total expense" from the first quarter to the fourth quarter. It can be found from the detailed chart 120 that bin 120a corresponding to "Gross profit" in the third quarter is shorter than bin 120b corresponding to "Total expense", which may mean that a fund loss occurs in the third quarter.

Figure 5:
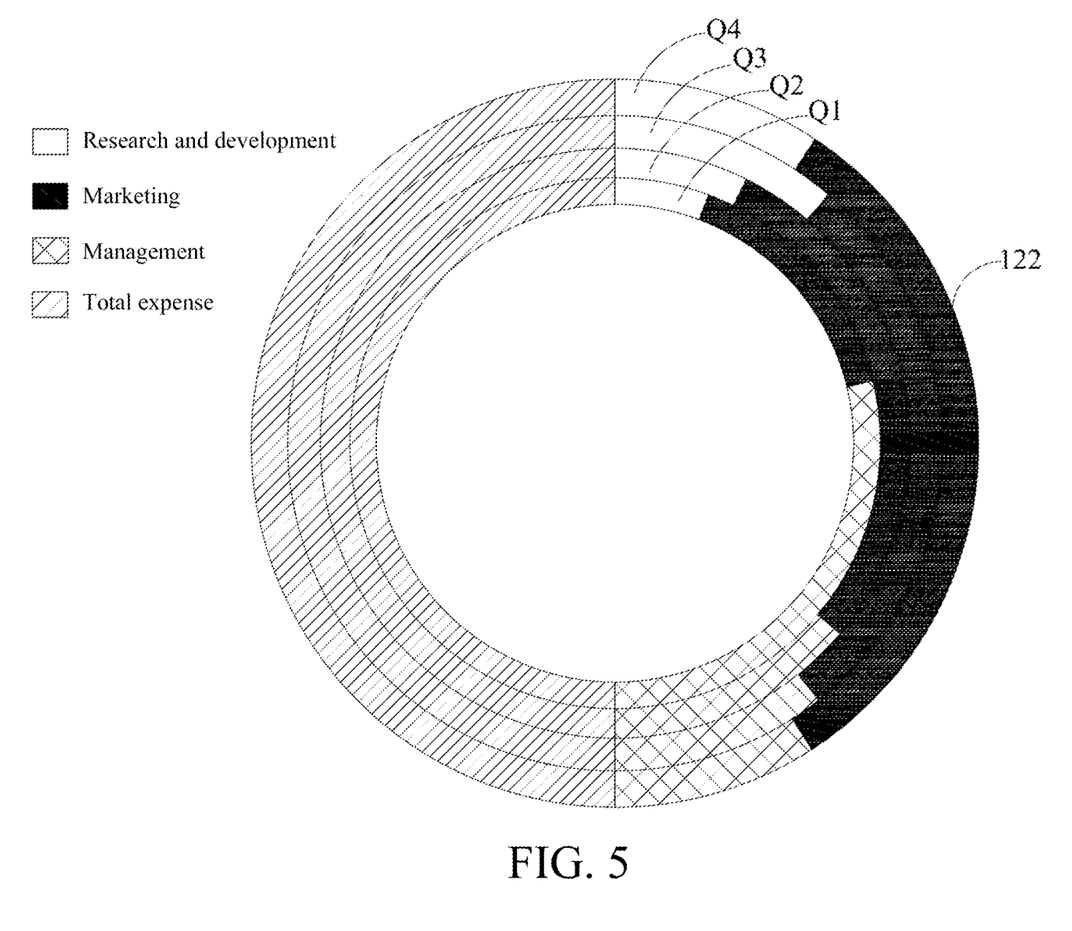
FIG. 5 is another detailed chart created according to FIG. 3 or FIG. 4, where the another detailed chart is a schematic diagram of a donut chart.

Referring to FIG. 5 together, FIG. 5 is another detailed chart created according to FIG. 3 or FIG. 4, where the detailed chart is a schematic diagram of a donut chart. As shown in FIG. 1 to FIG. 5, in order to understand the reason for the fund loss in the third quarter, the user may click the bin 120b (that is, the "Total expense" in the third quarter) in the detailed chart, or may click the formula cell D10 in the data sheet 108. The processing module 104 may drill down the formula cell D10 (the "Total expense" in the third quarter) to check its data, that is, look up the data sequences which the formula cell D10 refers to, for example, a row data sequence (B7:E7), a row data sequence (B8:E8), and a row data sequence (B9:E9). In addition, when the processing module 104 confirms that the formula expression of the formula cell D10 is an addition relation, the processing module 104 may set the recommended chart option as a donut chart, and apply the row data sequence (B7:E7) ("Research and development" expenses from the first quarter to the fourth quarter), the row data sequence (B8:E8) ("Marketing" expenses from the first quarter to the fourth quarter), and the row data sequence (B9:E9) ("Management" expenses from the first quarter to the fourth quarter) to the donut chart to generate another detailed chart 122. In this way, the user can find from the detailed chart 122 that "Research and development" expenses of the third quarter "Q3" are much higher than "Research and development" expenses of other quarters ("Q1", "Q2", and "Q4"), so as to learn the cause of the fund loss in the third quarter "Q3".

As shown in FIG. 1 to FIG. 4, in some embodiments, when the formula expression of the formula group is an addition relation, the recommended chart option may be selected from one or more of a stacked area chart, a pie chart, a donut chart, a stacked bar chart, a stacked column chart, a bar chart, and a column chart. Specifically, the formula structure of the formula expression is "=SUM (A, B, C, D)" or "=A+B+C+D", and the operation relation of the formula expression is the addition relation. In chart and data analysis, when the formula expression is the addition relation, the purpose is to find the comparison, composition, or distribution of these numbers, check an absolute difference or a relative difference between the numbers, or find out the composition percentages of the total number. Therefore, when the formula expression is an addition relation, the recommended chart option may be one of the stacked area chart, the pie chart, the donut chart, the stacked bar chart, the stacked column chart, the bar chart, the column chart, or a combination of two or more of the above charts. For example, the cell B10 represents "Total expense", and the formula expression of the cell is "=B7+B8+B9", which means a sum of "Research and development" expenses (at cell B7), "Marketing" expenses (at cell B8), and "Management" expenses (at cell B9) in the first quarter. Therefore, when the cell B7, the cell B8, and the cell B9 are in the addition relation, the processing module 104 sets the recommended chart option as the stacked area chart, the pie chart, the donut chart, the stacked bar chart, the stacked column chart, the bar chart, or the column chart according to the choice of the user. In addition, the cell B10, the cell C10, the cell D10, and the cell E10 all belong to the same row formula group (B10:E10), and all correspond to the data series label "Total expense". The cell B7 corresponds to the data series label "Research and development", the cell B8 corresponds to the data series label "Marketing", and the cell B9 corresponds to the data series label "Management". And the data category labels corresponding to the row formula group (B10:E10) are "Q1", "Q2", "Q3", and "Q4". Therefore, "Total expense" from the first quarter to the fourth quarter, "Research and development" expenses from the first quarter to the fourth quarter, "Marketing" expenses from the first quarter to the fourth quarter, and "Management" expenses from the first quarter to the fourth quarter respectively form four data sequences.

Figure 6:
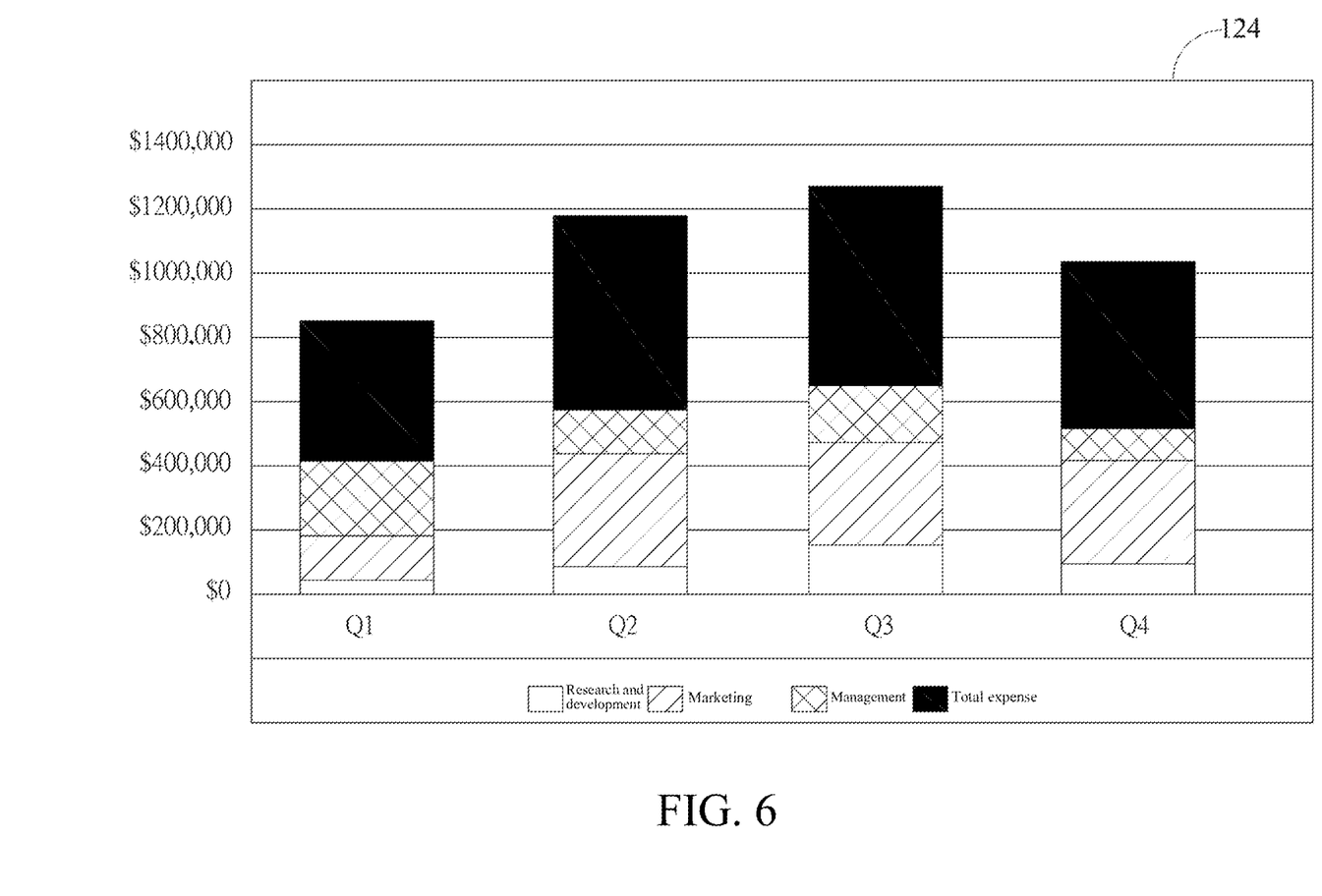
FIG. 6 is another detailed chart created by using "Total expense" in FIG. 3 or FIG. 4 as a drill-down object, where the another detailed chart is a schematic diagram of a stacked bar chart.

Referring to FIG. 6 together, FIG. 6 is another detailed chart created by using "Total expense" as a drill-down object in FIG. 3 or FIG. 4, where the detailed chart is a schematic diagram of a stacked bar chart. A range of the analysis area 109 is (A7:E10) by way of example. When the cell B10 is selected as the drill-down object, the processing module 104 may identify the cell B10 as the formula cell 112, and the formula expression of the cell B10 is "=B7+B8+B9". Therefore, the formula cell B10 refers to the cell B7 ($54,600), the cell B8 ($120,400), and the cell B9 ($244,783). The processing module 104 further enters data of the cells (B7:E7) corresponding to the cell B7, the cells (B8:E8) corresponding to the cell B8, and the cells (B9:E9) corresponding to the cell B9 in the row data sequences, respectively, and creates another detailed chart 124 accordingly. The processing module 104 may apply the data series labels and the data category labels to the recommended stacked bar chart option to generate the detailed stacked bar chart 124 including the data series labels ("Total expense", "Research and development", "Marketing", and "Management") and the data category labels ("Q1", "Q2", "Q3", and "Q4").

In some embodiments, when the formula expression of the formula group is a multiplication relation or a division relation, the recommended chart option is one of a combined line and bar chart, a combined line and column chart, or a combination of two or more of the above charts. Specifically, the formula structure of the formula expression is "=A*B" or "=A/B", and the operation relation of the formula expression is the multiplication relation or the division relation. In chart and data analysis, when the formula expression is the multiplication relation or the division relation, the purpose is to see the two numbers appearing side by side. Therefore, when the formula expression is the multiplication relation or the division relation, the recommended chart option may be one of a combined line and bar chart, a combined line and column chart, or a combination of two or more of the above charts.

In some embodiments, when the formula expression of the formula group comprises a statistical relation, the recommended chart option is one of a line chart, a pie chart, a bar chart, an area chart, a column chart, a histogram, a scatter diagram, a bell curve, or a combination of two or more of the above charts. In some embodiments, the statistical relation may be, for example, a count function, a unique function, an average function, a minimum (Min) function, a maximum (Max) function, a median function, a standard deviation (StdDev) function, or a variance (Var) function. When the statistical relation is the count function, the recommended chart option may be any selected from the line chart, the bar chart, the column chart, the pie chart, or any combination of the plurality of options. When the statistical relation is the unique function, the recommended chart option may be any selected from the line chart, the bar chart, the column chart, the pie chart, or any combination of the plurality of options. When the statistical relation is the average function, the recommended chart option may be any selected from the line chart, the column chart, the area chart, the histogram, the scatter diagram, the bell curve, the bar chart, or any combination of the plurality of options. When the statistical relation is the minimum function, the recommended chart option is any selected from the line chart, the bar chart, the column chart, or any combination of the plurality of options. When the statistical relation is the maximum function, the recommended chart option is any selected from the line chart, the bar chart, the column chart, or any combination of the plurality of options. When the statistical relation is the median function, the recommended chart option may be any selected from the line chart, the bar chart, the column chart, the area chart, the histogram, the scatter diagram, the bell curve, or any combination of the plurality of options. When the statistical relation is the standard deviation function, the recommended chart option may be any selected from the line chart, the bar chart, the column chart, the histogram, the scatter diagram, the bell curve, the area chart, or any combination of the plurality of options. When the statistical relation is the variance function, the recommended chart option may be any selected from the line chart, the bar chart, the column chart, the histogram, the scatter diagram, the bell curve, the area chart, or any combination of the plurality of options.

Based on the above, according to the electronic device and the non-transitory computer-readable storage medium provided in some embodiments, the processing module can screen out appropriate recommended chart option(s) according to the formula structures of the formula groups in the data sheet by executing the program instruction(s). In addition, the processing module can obtain the detailed chart according to the selected recommended chart option, the data sequence(s), the data series label(s), and the data category label(s) after determining the recommended chart option.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
a storage module, configured to store at least one program instruction; and
a processing module, coupled to the storage module and configured to load the at least one program instruction to perform the following steps:
parsing a plurality of cells in an analysis area in a data sheet to identify each of the cells as a formula cell or a non-formula cell;
classifying the formula cells so that the formula cells having similar formula expressions fall into the same formula group; and
analyzing a formula structure of the formula expressions of each formula group to output at least one recommended chart option.

2. The electronic device according to claim 1, wherein the similar formula expressions mean that the formula expressions have the same formula structure and the same cell offsets.

3. The electronic device according to claim 2, wherein the processing module further performs the following steps: forming at least one data sequence according to data of a plurality of reference cells to which the formula cells in the same formula group refer; and displaying a detailed chart comprising the at least one data sequence according to a selected recommended chart option.

4. The electronic device according to claim 3, wherein the processing module further performs the following steps: selecting at least one cell as a drill-down object, and performing drill-down according to the drill-down object to generate another detailed chart.

5. The electronic device according to claim 4, wherein the processing module further performs the following step: obtaining at least one data series label and at least one data category label according to at least one column data sequence and at least one row data sequence corresponding to the formula group.

6. The electronic device according to claim 5, wherein when the formula expression of the formula group is a subtraction relation, the recommended chart option is any or any combination of a bar chart, a column chart, a line percentage chart, a column percentage chart, and a bar percentage chart.

7. The electronic device according to claim 5, wherein when the formula expression of the formula group is an addition relation, the recommended chart option is any or any combination of a stacked area chart, a pie chart, a donut chart, a stacked bar chart, a stacked column chart, a bar chart, and a column chart.

8. The electronic device according to claim 5, wherein when the formula expression of the formula group is a multiplication relation or a division relation, the recommended chart option is any or any combination of a combined line and bar chart and a combined line and column chart.

9. The electronic device according to claim 5, wherein when the formula expression of the formula group comprises a statistical relation, the recommended chart option is any or any combination of a line chart, a pie chart, a bar chart, a column chart, a histogram, a scatter diagram, a bell curve, and an area chart.

10. The electronic device according to claim 9, wherein the formula group is the statistical relation, and the statistical relation is:
- a count function, wherein the recommended chart option is any or any combination of the line chart, the bar chart, the column chart, and the pie chart;
- a unique function, wherein the recommended chart option is any or any combination of the line chart, the bar chart, the column chart, and the pie chart;
- an average function, wherein the recommended chart option is any or any combination of the line chart, the column chart, the area chart, the histogram, the scatter diagram, the bell curve, and the bar chart;
- a minimum function, wherein the recommended chart option is any or any combination of the line chart, the bar chart, and the column chart;
- a maximum function, wherein the recommended chart option is any or any combination of the line chart, the bar chart, and the column chart;
- a median function, wherein the recommended chart option is any or any combination of the line chart, the column chart, the area chart, the histogram, the scatter diagram, the bell curve, and the bar chart;
- a standard deviation function, wherein the recommended chart option is any or any combination of the line chart, the bar chart, the column chart, the histogram, the scatter diagram, the bell curve, and the area chart; and
- a variance function, wherein the recommended chart option is any or any combination of the line chart, the bar chart, the column chart, the histogram, the scatter diagram, the bell curve, and the area chart.

11. A non-transitory computer-readable storage medium, storing at least one program instruction, wherein an electronic device loads the at least one program instruction to perform the following steps:
- parsing a plurality of cells in an analysis area in a data sheet to identify each of the cells as a formula cell or a non-formula cell;
- classifying the formula cells so that the formula cells having similar formula expressions fall into the same formula group; and
- analyzing a formula structure of the formula expressions of each formula group to output at least one recommended chart option.

12. The non-transitory computer-readable storage medium according to claim 11, wherein the similar formula expressions mean that the formula expressions have the same formula structure and the same cell offsets.

13. The non-transitory computer-readable storage medium according to claim 12, wherein a processing module further performs the following steps: forming at least one data sequence according to data of a plurality of reference cells to which the formula cells in the same formula group refer; and displaying a detailed chart comprising the at least one data sequence according to a selected recommended chart option.

14. The non-transitory computer-readable storage medium according to claim 13, wherein the processing module further performs the following steps: selecting at least one cell as a drill-down object, and performing drill-down according to the drill-down object to generate another detailed chart.

15. The non-transitory computer-readable storage medium according to claim 14, wherein the processing module further performs the following step: obtaining at least one data series label and at least one data category label according to at least one column data sequence and at least one row data sequence corresponding to the formula group.

16. The non-transitory computer-readable storage medium according to claim 15, wherein when the formula expression of the formula group is a subtraction relation, the recommended chart option is any or any combination of a bar chart, a column chart, a line percentage chart, a column percentage chart, and a bar percentage chart.

17. The non-transitory computer-readable storage medium according to claim 15, wherein when the formula expression of the formula group is an addition relation, the recommended chart option is any or any combination of a stacked area chart, a pie chart, a donut chart, a stacked bar chart, a stacked column chart, a bar chart, and a column chart.

18. The non-transitory computer-readable storage medium according to claim 15, wherein when the formula expression of the formula group is a multiplication relation or a division relation, the recommended chart option is any or any combination of a combined line and bar chart and a combined line and column chart.

19. The non-transitory computer-readable storage medium according to claim 15, wherein when the formula expression of the formula group comprises a statistical relation, the recommended chart option is any or any combination of a line chart, a pie chart, a bar chart, a column chart, a histogram, a scatter diagram, a bell curve, and an area chart.

20. The non-transitory computer-readable storage medium according to claim 19, wherein the formula group is the statistical relation, and the statistical relation is:
- a count function, wherein the recommended chart option is any or any combination of the line chart, the bar chart, the column chart, and the pie chart;
- a unique function, wherein the recommended chart option is any or any combination of the line chart, the bar chart, the column chart, and the pie chart;
- an average function, wherein the recommended chart option is any or any combination of the line chart, the column chart, the area chart, the histogram, the scatter diagram, the bell curve, and the bar chart;
- a minimum function, wherein the recommended chart option is any or any combination of the line chart, the bar chart, and the column chart;
- a maximum function, wherein the recommended chart option is any or any combination of the line chart, the bar chart, and the column chart;
- a median function, wherein the recommended chart option is any or any combination of the line chart, the column chart, the area chart, the histogram, the scatter diagram, the bell curve, and the bar chart;
- a standard deviation function, wherein the recommended chart option is any or any combination of the line chart, the bar chart, the column chart, the histogram, the scatter diagram, the bell curve, and the area chart; and
- a variance function, wherein the recommended chart option is any or any combination of the line chart, the bar chart, the column chart, the histogram, the scatter diagram, the bell curve, and the area chart.

* * * * *